Patented Sept. 5, 1933

1,925,421

UNITED STATES PATENT OFFICE 1,925,421

PROCESS FOR SPLITTING HYDROCARBONS

Adrianus Johannes van Peski, Amsterdam, Netherlands, assignor to De Bataafsche Petroleum Maatschappij, The Hague, Netherlands No Drawing. Application November 30, 1928, Serial No. 322,977, and in the Netherlands December 16, 1927

4 Claims. (Cl. 260—170)

It is known that hydrocarbons may be split for obtaining hydrocarbons of lower molecular weight therefrom by heating the starting material whether at ordinary, higher or lower pressures.

A drawback of such processes is that the reaction cannot sufficiently be controlled.

Furthermore it is known that there are several substances which have a catalyzing effect on splitting of high boiling hydrocarbons.

Among others, iodine is known to act as a catalyst for the destructive distillation of high-boiling hydrocarbons into lower boiling hydrocarbons.

Now it was found that also the other halogens or certain compounds therefrom, for example, ethylene bromide, trichlorethylene, hydrogen chloride, have a favourable effect on the cracking of hydrocarbons. Not only are such halogens suitable catalysts for splitting hydrocarbons of high boiling points, but it has also been found that these substances are excellent catalysts for converting hydrocarbons which normally are in a gaseous form into unsaturated hydrocarbons of lower molecular weight.

Furthermore it has been found that iodine or certain compounds therefrom, for example, iodoform, may act as catalysts for converting gaseous hydrocarbons into unsaturated hydrocarbons such as olefines of lower molecular weight.

It should be noted that although it is known that iodine is a catalyst for cracking high-boiling hydrocarbons, it was not to be expected that said substance would also have a favourable influence on the conversion of gaseous saturated hydrocarbons into unsaturated hydrocarbons of lower molecular weight.

Such gaseous saturated hydrocarbons are very resistant to cracking. If high temperatures are used, cracking goes too far, so that the lowest unsaturated hydrocarbons are formed, and at still higher temperature deposition of carbon takes place. At lower temperature, higher unsaturated hydrocarbons are formed, but the reaction velocity is then too small to give a good yield of the desired products. Now it has been found that if the conversion of the gaseous hydrocarbons is carried out in the presence of halogens, the reaction velocity at lower temperatures is considerably increased so that a large amount of higher unsaturated hydrocarbons is formed without any deposition of carbon.

As halogen compounds, those of organic as well as of inorganic nature may be employed, and preferably those which at high temperature yield halogen or hydrogen halides.

As inorganic compounds, besides elementary halogen itself, hydrogen-, sulphur-, phosphor- and oxygen-containing compounds may, for example, be used. Further examples of inorganic compounds are hydrogen chloride, sulphuryl chloride, phosphor oxychloride and sulphur chloride. Examples of organic halogen compounds are iodoform, ethylene bromide, trichlorethylene and carbon tetrachloride.

The addition of halogen or halogen compounds may be carried out in a very simple and known way, the more so as a large number of substances which, either in solid, liquid or gaseous state, or dispersed in a suitable medium, can be added to the material to be treated.

Furthermore, different activators, for instance copper, iron or salts therefrom, oxygen, sulphur and the like may be added to promote the reaction.

Example

To propane, some hundredths of 1% by volume of iodine are added, whereafter the mixture is heated. At 575° C., the outflowing gases contain approximately 15½% of compounds of unsaturated nature; at 600° C., about 25%; and at 650° C., about 35.3% of unsaturated hydrocarbons. The unsaturated hydrocarbons comprise propylene and ethylene.

The iodine employed may be easily recovered. Free iodine sublimates partly when cooling the cracked gases. The dissolved part may be extracted with sulphite.

Furthermore it is possible to perform the described process at ordinary pressure, as well as at higher or lower pressures; and as far as high-boiling hydrocarbons are concerned, the invention comprises either cracking in the gaseous or in the liquid state.

Not only can propane be treated as set forth above, but ethane, butane, and pentane may be similarly treated.

It should be understood that the invention comprises also all methods known in themselves for bringing into contact the said catalysts and the material to be treated in the form of a molecular dispersion, as well as in other forms; for instance, by means of atomizing.

What I claim is:

1. A process of splitting propane into olefines which are normally gaseous, which comprises heating the propane to a temperature between 575° and 650° C. in the presence of a catalyst comprising a halogen.

2. A process of splitting propane into olefines which are normally gaseous, which comprises heating the propane to a temperature between 575° and 650° C. in the presence of an iodine catalyst.

3. A process of splitting propane into olefines which are normally gaseous, which comprises heating the propane to a cracking temeprature in the presence of a halogen catalyst.

4. A process of splitting propane into olefines which are normally gaseous, which comprises heating the propane to a cracking temperature in the presence of an iodine catalyst.

ADRIANUS JOHANNES VAN PESKI.